(12) United States Patent
Tsai (10) Patent No.: US 11,598,497 B2
(45) Date of Patent: Mar. 7, 2023

(54) LIGHT STRING

(71) Applicant: Cosmo Lighting Inc., Walnut, CA (US)

(72) Inventor: Nai-Chen Tsai, New Taipei (TW)

(73) Assignee: Cosmo Lighting Inc., Walnut, CA (US)

( * ) Notice: Subject to any disclaimer, the term of this patent is extended or adjusted under 35 U.S.C. 154(b) by 319 days.

(21) Appl. No.: 17/093,642

(22) Filed: Nov. 10, 2020

(65) Prior Publication Data
US 2021/0262624 A1 Aug. 26, 2021

(30) Foreign Application Priority Data

Feb. 26, 2020 (TW) ................................ 109106283

(51) Int. Cl.
| | |
|---|---|
| *F21S 4/24* | (2016.01) |
| *F21V 23/00* | (2015.01) |
| *H05B 45/40* | (2020.01) |
| *F21S 4/10* | (2016.01) |
| *H05B 47/17* | (2020.01) |
| *H05B 47/16* | (2020.01) |
| *F21S 9/02* | (2006.01) |
| *F21S 10/02* | (2006.01) |
| *F21V 23/04* | (2006.01) |
| *F21Y 115/10* | (2016.01) |
| *F21W 121/04* | (2006.01) |

(52) U.S. Cl.
CPC . *F21S 4/24* (2016.01); *F21S 4/10* (2016.01); *F21S 9/02* (2013.01); *F21S 10/023* (2013.01); *F21V 23/001* (2013.01); *F21V 23/008* (2013.01); *F21V 23/04* (2013.01); *H05B 45/40* (2020.01); *H05B 47/16* (2020.01); *H05B 47/17* (2020.01); *F21W 2121/04* (2013.01); *F21Y 2115/10* (2016.08)

(58) Field of Classification Search
None
See application file for complete search history.

(56) References Cited

U.S. PATENT DOCUMENTS

| 8,651,700 B2 * | 2/2014 | Peng | ......................... F21S 4/10 |
|---|---|---|---|
| | | | 362/249.06 |
| 10,578,260 B1 * | 3/2020 | Chen | ..................... F21V 21/002 |

(Continued)

*Primary Examiner* — Crystal L Hammond
(74) *Attorney, Agent, or Firm* — Li & Cai Intellectual Property Office (57) ABSTRACT

A light string is provided. The light string includes a plurality of light-emitting components, a first polyvinyl chloride covered wire and a second polyvinyl chloride covered wire. The light-emitting components are configured to emit light having a same color or different colors. A first polyvinyl chloride covered wire is electrically connected to a first terminal of each of the light-emitting components and a first power terminal of a power supply component. The first polyvinyl chloride covered wire receives a first voltage from the first power terminal of the power supply component. The second polyvinyl chloride covered wire is electrically connected to a second terminal of each of the light-emitting components and a second power terminal of the power supply component. The second polyvinyl chloride covered wire receives a second voltage from the second power terminal of the power supply component.

18 Claims, 11 Drawing Sheets

(56) References Cited

U.S. PATENT DOCUMENTS

| | | | |
|---|---|---|---|
| 10,641,474 B2* | 5/2020 | Zhu | F21S 4/10 |
| 2005/0146870 A1* | 7/2005 | Wu | F21S 4/22 |
| | | | 257/E25.02 |
| 2016/0183338 A1* | 6/2016 | Loomis | H05B 45/48 |
| | | | 315/185 R |
| 2016/0341408 A1* | 11/2016 | Altamura | F21V 19/001 |
| 2017/0089528 A1* | 3/2017 | He | F21S 4/20 |
| 2019/0277458 A1* | 9/2019 | Shao | F21S 4/26 |

\* cited by examiner

LIGHT STRING

CROSS-REFERENCE TO RELATED PATENT APPLICATION

This application claims priority from Taiwan Patent Application No. 109106283 filed Feb. 26, 2020, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a light string, and more particularly to a light string using polyvinyl chloride (PVC) covered wires.

BACKGROUND OF THE DISCLOSURE

String lighting sets have long been used throughout the world on a commercial basis to provide illumination in car lots, etc. or for enhancing trees or the like at night. Such string lights are also used worldwide on Christmas trees and as decorative lighting on houses and in businesses for festive periods and advertising.

SUMMARY OF THE DISCLOSURE

The present disclosure provides a light string. The light string includes a plurality of light-emitting components, a first polyvinyl chloride covered wire and a second polyvinyl chloride covered wire. The light-emitting components are configured to emit light having a same color or different colors. The first polyvinyl chloride covered wire has a first conductor and a first insulator. One part of the first conductor is covered by the first insulator and other parts of the first conductor are exposed. The first conductor is electrically connected to a first terminal of each of the light-emitting components and a power supply component. The first conductor of the first polyvinyl chloride covered wire receives a first voltage supplied by the power supply component. The second polyvinyl chloride covered wire has a second conductor and a second insulator. One part of the second conductor is covered by the second insulator and other parts of the second conductor are exposed. The second conductor is electrically connected to a second terminal of each of the light-emitting components and the power supply component. The second conductor of the second polyvinyl chloride covered wire receives a second voltage from the power supply component.

In certain embodiments, each of the light-emitting components is placed on the first polyvinyl chloride covered wire and the second polyvinyl chloride covered wire.

In certain embodiments, each of the light-emitting components is placed between the first polyvinyl chloride covered wire and the second polyvinyl chloride covered wire.

In certain embodiments, the first terminal of each of the plurality of light-emitting components is a positive electrode and receives the first voltage that is a positive voltage. The second terminal of each of the plurality of light-emitting components is a negative electrode and receives the second voltage that is a negative voltage.

In certain embodiments, the first terminal of each of the plurality of light-emitting components is a negative electrode and receives the first voltage that is a negative voltage. The second terminal of each of the plurality of light-emitting components is a positive electrode and receives the second voltage that is a positive voltage. The first terminal of each of the plurality of light-emitting components arranged along even columns is a negative electrode. The second terminal of each of the plurality of light-emitting components arranged along the even columns is a positive electrode.

In certain embodiments, the first terminal of each of the plurality of light-emitting components arranged along odd columns is a negative electrode. The second terminal of each of the plurality of light-emitting components arranged along the odd columns is a positive electrode. The first terminal of each of the plurality of light-emitting components arranged along even columns is a positive electrode. The second terminal of each of the plurality of light-emitting components arranged along the even columns is a negative electrode.

In certain embodiments, the light string further includes a third polyvinyl chloride covered wire. The third polyvinyl chloride covered wire has a third conductor and a third insulator. One part of the third conductor is covered by the third insulator and other parts of the third conductor are exposed. The third conductor of the third polyvinyl chloride covered wire is electrically connected to the first conductor of the first polyvinyl chloride covered wire and the power supply component. The first conductor of the first polyvinyl chloride covered wire receives the first voltage through the third conductor of the third polyvinyl chloride covered wire from the power supply component.

In certain embodiments, the light string further includes a third polyvinyl chloride covered wire. The third polyvinyl chloride covered wire has a third conductor and a third insulator. One part of the third conductor is covered by the third insulator and other parts of the third conductor are exposed. The third conductor of the third polyvinyl chloride covered wire is electrically connected to the second conductor of the second polyvinyl chloride covered wire and the power supply component, and the second conductor receives the second voltage through the third conductor of the third polyvinyl chloride covered wire from the power supply component.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
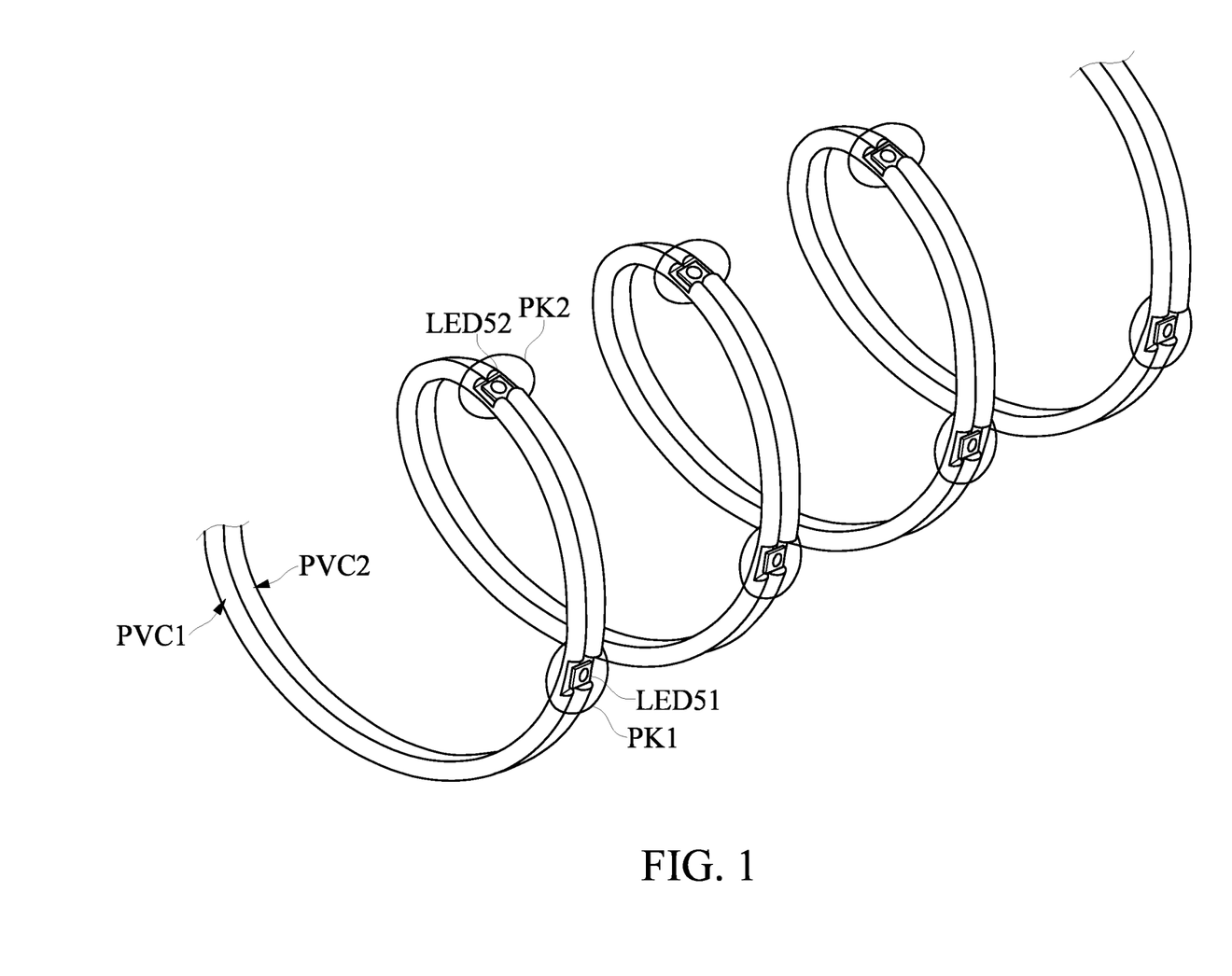
FIG. 1 is a schematic diagram of a light string including a light-emitting component placed on two polyvinyl chloride covered wires according to an embodiment of the present disclosure.
Figure 2:
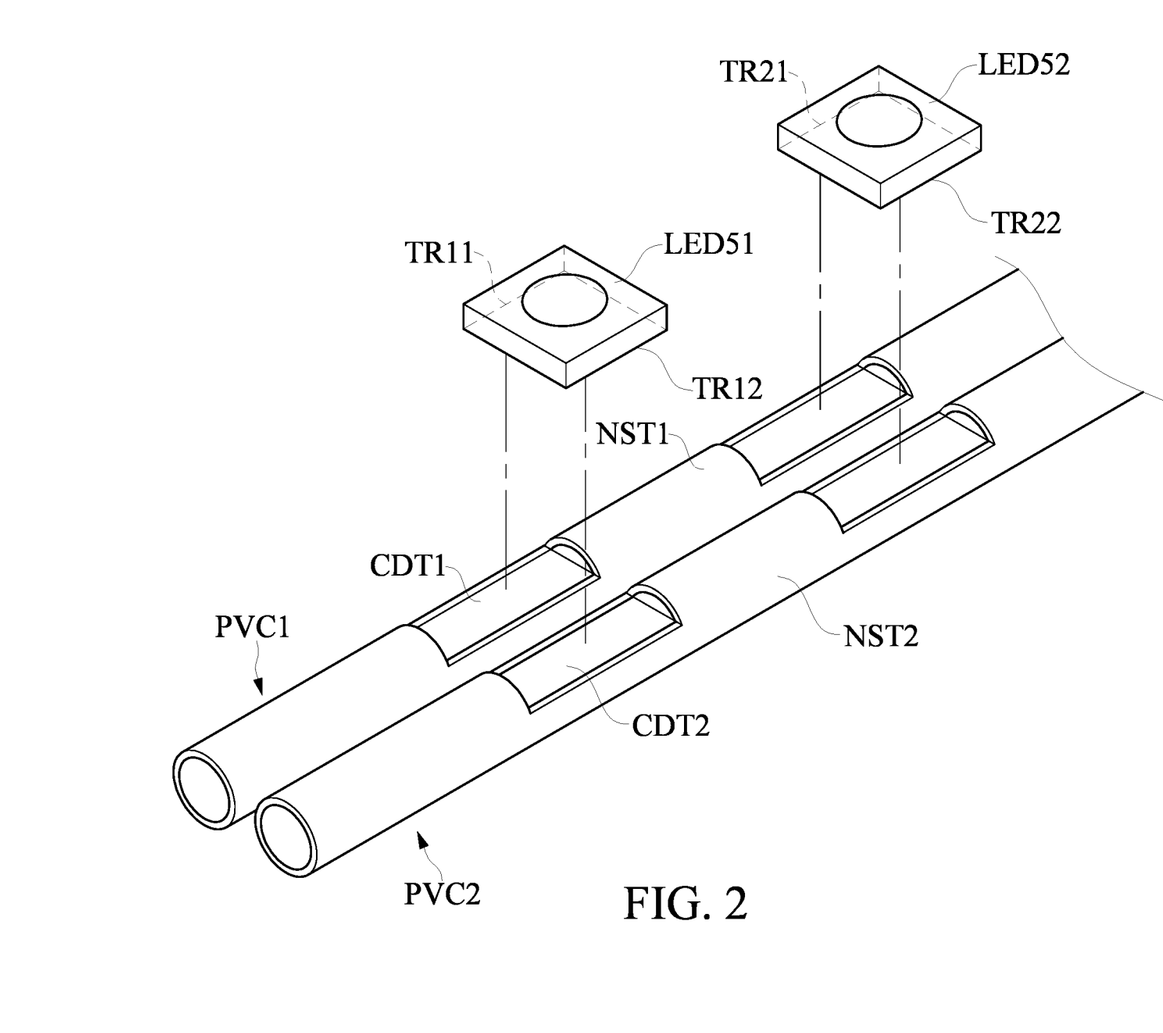
FIG. 2 is an exploded diagram of the light string according to an embodiment of the present disclosure.
Figure 3:
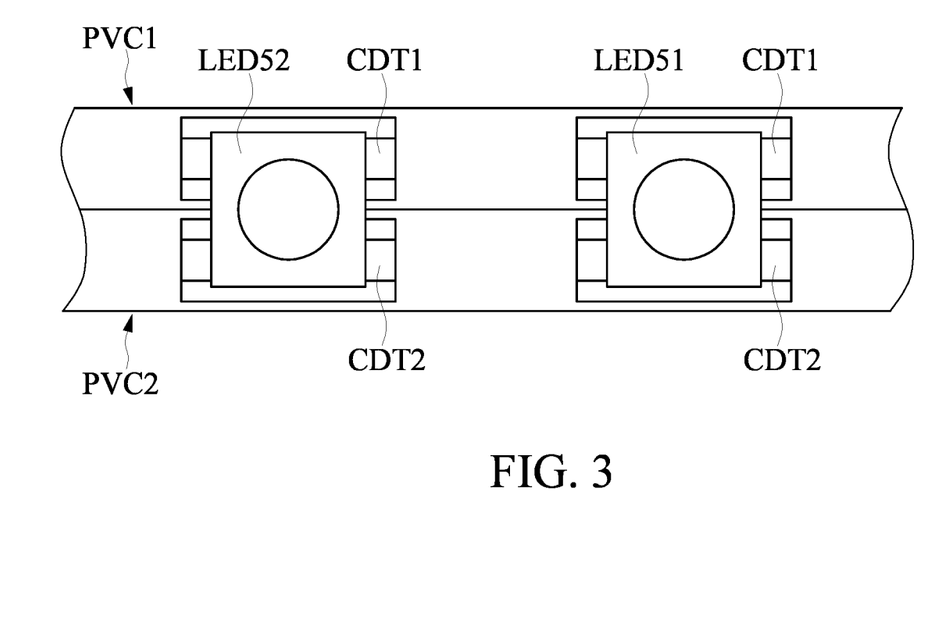
FIG. 3 is a schematic diagram of the light string including the light-emitting component placed on the two polyvinyl chloride covered wires according to the embodiment of the present disclosure.

Reference is made to FIGS. 1 to 3. As shown in FIG. 1, the light string includes a first polyvinyl chloride covered wire PVC1, a second polyvinyl chloride covered wire PVC2, and a plurality of light-emitting components such as a first light-emitting component LED51 and a second light-emitting component LED52.

The polyvinyl chloride covered wire PVC1 passes through an encapsulation layer PK1, from one side of the encapsulation layer PK1 to another side of the encapsulation layer PK1. The polyvinyl chloride covered wire PVC2 passes through an encapsulation layer PK2, from one side of the encapsulation layer PK2 to another side of the encapsulation layer PK2.

The first encapsulation layer PK1 and the second encapsulation layer PK2 may preferably be made of light-permeable materials. Under this condition, lights emitted by the first light-emitting component LED51 and the second light-emitting component LED52 can respectively penetrate the first encapsulation layer PK1 and the second encapsulation layer PK2, thereby achieving an illumination effect.

The first light-emitting component LED51 and the second light-emitting component LED52 are respectively covered by the first encapsulation layer PK1 and the second encapsulation layer PK2.

As shown in FIG. 2, the first polyvinyl chloride covered wire PVC1 has a first conductor CDT1 and a first insulator NST1. One part of the first conductor CDT1 is covered by the first insulator NST1, but other parts of the first conductor CDT1 are exposed by two first through holes penetrating through an upper surface of the first insulator NST1. The second polyvinyl chloride covered wire PVC2 has a second conductor CDT2 and a second insulator NST2. One part of the second conductor CDT2 is covered by the second insulator NST2, but other parts of the second conductor CDT2 are exposed by two second through holes penetrating through an upper surface of the second insulator NST2.

A first terminal TR11 of the first light-emitting component LED51 is conductively bonded to the first conductor CDT1 of the first polyvinyl chloride covered wire PVC1. A second terminal TR12 of the first light-emitting component LED51 is conductively bonded to the second conductor CDT2 of the second polyvinyl chloride covered wire PVC2. Similarly, a first terminal TR21 of the second light-emitting component LED52 is conductively bonded to the first conductor CDT1 of the first polyvinyl chloride covered wire PVC1. A second terminal TR22 of the second light-emitting component LED52 is conductively bonded to the second conductor CDT2 of the second polyvinyl chloride covered wire PVC2. As shown in FIGS. 2 and 3, both of the first light-emitting component LED51 and the second light-emitting component LED52 are placed on the first polyvinyl chloride covered wire PVC1 and the second polyvinyl chloride covered wire PVC2.

Figure 4:
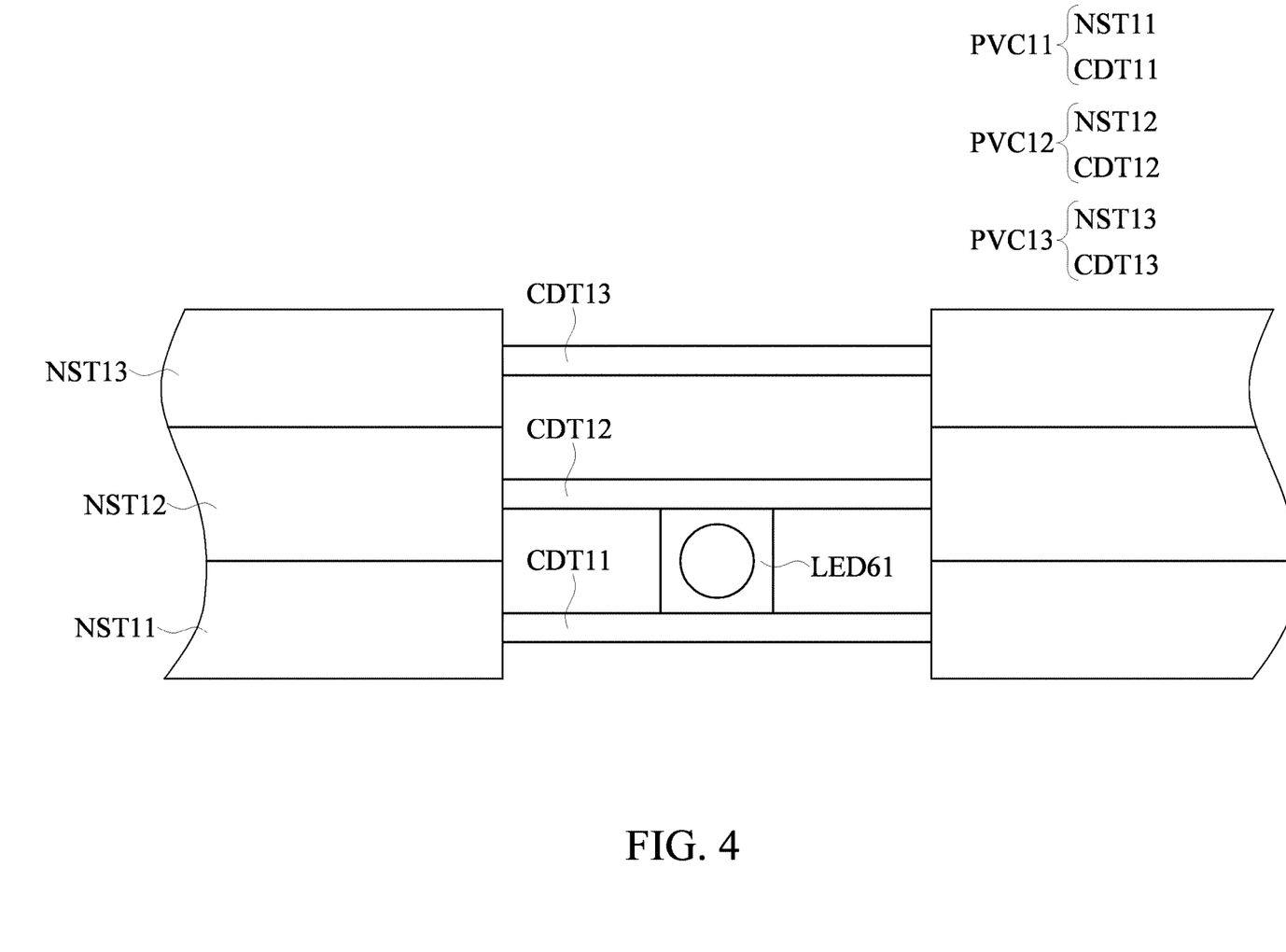
FIG. 4 is a schematic diagram of a light string including a light-emitting component placed between two polyvinyl chloride covered wires according to an embodiment of the present disclosure.

Reference is made to FIG. 4. The light-emitting component LED61 is placed between a first conductor CDT11 of the first polyvinyl chloride covered wire PVC11 and a second conductor CDT12 of the second polyvinyl chloride covered wire PVC12.

Figure 5:
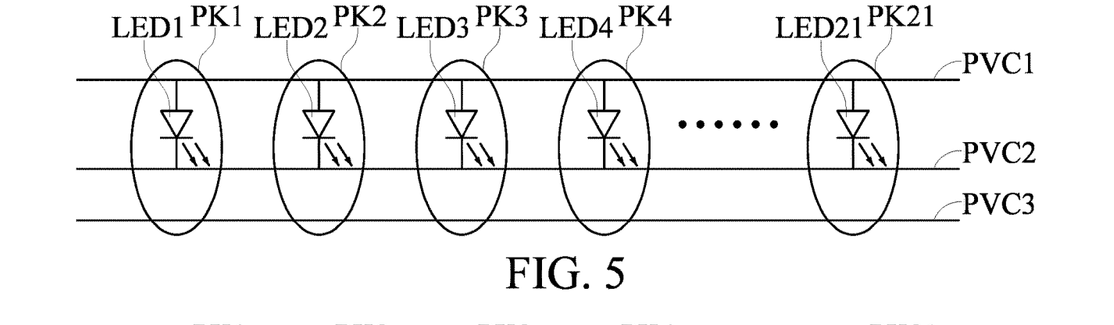
FIG. 5 is a circuit layout diagram of three polyvinyl chloride covered wires and light-emitting components of a light string according to an embodiment of the present disclosure.

Reference is made to FIG. 5. The light string includes a first polyvinyl chloride covered wire PVC1, a second polyvinyl chloride covered wire PVC2, a third polyvinyl chloride covered wire PVC3, and a plurality of light-emitting components LED1 to LED21. Each of the light-emitting components LED1 to LED21 may be a light-emitting diode and have a single chip. In practice, the types and the number of polyvinyl chloride covered wires and the light-emitting components in the light string may be adjusted according to actual requirements.

The first polyvinyl chloride covered wire PVC1, the second polyvinyl chloride covered wire PVC2 and the third polyvinyl chloride covered wire PVC3 may be disposed in parallel with each other and spaced apart from each other at the same predetermined distance. The second polyvinyl chloride covered wire PVC2 is disposed between the first polyvinyl chloride covered wire PVC1 and the third polyvinyl chloride covered wire PVC3.

A first conductor of the first polyvinyl chloride covered wire PVC1 is electrically connected to the first terminals of the light-emitting components LED1 to LED21. The first terminals of the light-emitting components may be positive electrodes. A second conductor of the second polyvinyl chloride covered wire PVC2 is electrically connected to the second terminals of the light-emitting components LED1 to LED21. The second terminals of the light-emitting components are negative electrodes. In practice, the first terminals of the light-emitting components may be negative electrodes, and the second terminals of the light-emitting components may be positive electrodes.

The first conductor of the first polyvinyl chloride covered wire PVC1 and the second conductor of the second polyvinyl chloride covered wire PVC2 may be electrically connected to a power supply component.

When the first conductor of the first polyvinyl chloride covered wire PVC1 receives a first voltage that is a positive voltage from the power supply component and the second conductor of the second polyvinyl chloride covered wire PVC2 receives a second voltage that is a negative voltage from the power supply component, the light-emitting components LED1 to LED21 can synchronously emit lights having a same color or different colors.

Figure 6:
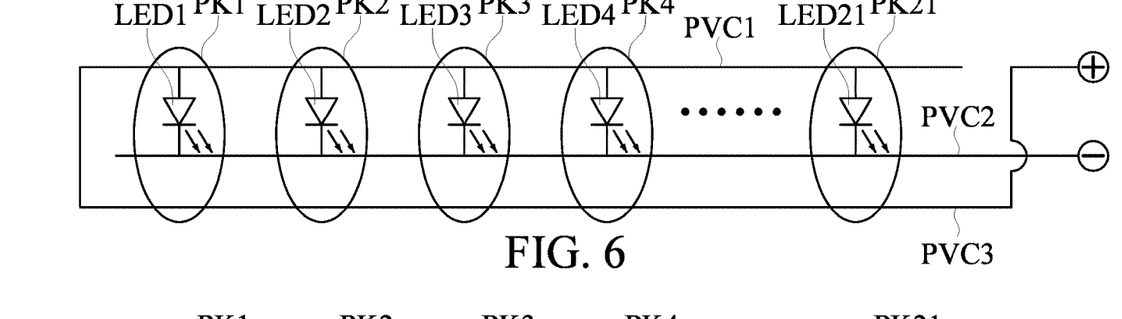
FIG. 6 is a circuit layout diagram of three polyvinyl chloride covered wires and light-emitting components of a light string according to an embodiment of the present disclosure.

Reference is made to FIG. 6. As shown in FIG. 6, the light string includes the first polyvinyl chloride covered wire PVC1, the second polyvinyl chloride covered wire PVC2, the third polyvinyl chloride covered wire PVC3, and the light-emitting components LED1 to LED21.

The third polyvinyl chloride covered wire PVC3 has a third conductor and a third insulator. One part of the third conductor is exposed, and other parts of the third conductor are covered by the third insulator.

The first conductor of the first polyvinyl chloride covered wire PVC1 is electrically connected to a third conductor of the third polyvinyl chloride covered wire PVC3. Further, the third conductor of the third polyvinyl chloride covered wire PVC3 is electrically connected to a first power terminal of the power supply component.

Therefore, the first conductor of the first polyvinyl chloride covered wire PVC1 is electrically connected to the first power terminal of the power supply component through the third conductor of the third polyvinyl chloride covered wire PVC3. The second conductor of the second polyvinyl chloride covered wire PVC2 is electrically connected to a second power terminal of the power supply component.

In the embodiment, the first voltage is a positive voltage and the second voltage is a negative voltage, but the present disclosure is not limited thereto.

When the first conductor of the first polyvinyl chloride covered wire PVC1 receives the first voltage that may a positive voltage from the power supply component through the third polyvinyl chloride covered wire PVC3, and the second conductor of the second polyvinyl chloride covered wire PVC2 receives the second voltage that may a negative voltage from the power supply component, the light-emitting components LED1 to LED21 can synchronously emit lights having a same color or different colors.

Figure 7:
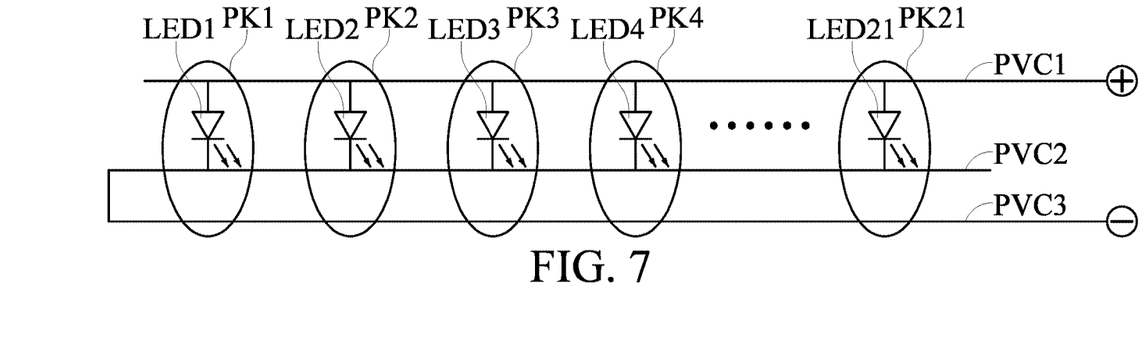
FIG. 7 is a circuit layout diagram of three polyvinyl chloride covered wires and light-emitting components of a light string according to an embodiment of the present disclosure.

Reference is made to FIG. 7. As shown in FIG. 7, the light string includes the first polyvinyl chloride covered wire PVC1, the second polyvinyl chloride covered wire PVC2, the third polyvinyl chloride covered wire PVC3, and the light-emitting components LED1 to LED21.

The first conductor of the first polyvinyl chloride covered wire PVC1 is electrically connected to the first power terminal of the power supply component. The second conductor of the second polyvinyl chloride covered wire PVC2 is electrically connected to the third conductor of the third polyvinyl chloride covered wire PVC3. Further, the third conductor of the third polyvinyl chloride covered wire PVC3 is electrically connected to the second power terminal of the power supply component.

Therefore, the second conductor of the second polyvinyl chloride covered wire PVC2 is electrically connected to the second power terminal of the power supply component through the third conductor of the third polyvinyl chloride covered wire PVC3.

When the first conductor of the first polyvinyl chloride covered wire PVC1 receives a first voltage that is a positive voltage from the power supply component, and the second conductor of the second polyvinyl chloride covered wire PVC2 receives a second voltage that is a negative voltage from the power supply component through the third polyvinyl chloride covered wire PVC3, the light-emitting components LED1 to LED21 can synchronously emit lights having a same color or different colors.

Figure 8:
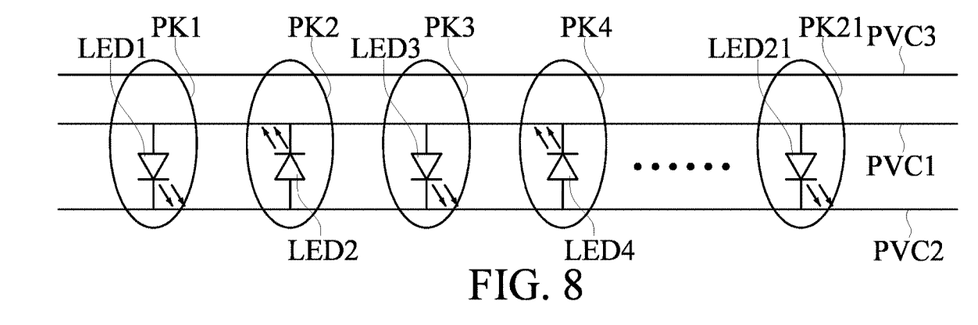
FIG. 8 is a circuit layout diagram of three polyvinyl chloride covered wires and light-emitting components of a light string according to an embodiment of the present disclosure.

Reference is made to FIG. 8. As shown in FIG. 8, the light string includes the first polyvinyl chloride covered wire PVC1, the second polyvinyl chloride covered wire PVC2, the third polyvinyl chloride covered wire PVC3, and the light-emitting components LED1 to LED21.

For example, each of the light-emitting components LED1 to LED21 may be a light-emitting diode and have a single chip.

The first conductor of the first polyvinyl chloride covered wire PVC1 is electrically connected to the first terminals that are positive electrodes of the light-emitting components LED1, LED3 to LED21 that are arranged along odd columns. The second conductor of the second polyvinyl chloride covered wire PVC2 is electrically connected to the second terminals that are negative electrodes of the light-emitting components LED1, LED3 to LED21 that are arranged along the odd columns.

The first conductor of the first polyvinyl chloride covered wire PVC1 is electrically connected to the first terminals that are negative electrodes of the light-emitting components LED2, LED4 to LED20 that are arranged along even columns. The second conductor of the second polyvinyl chloride covered wire PVC2 is electrically connected to the second terminals that are positive electrodes of the other light-emitting components LED2, LED4 to LED20 that are arranged along the even columns.

The first conductor of the first polyvinyl chloride covered wire PVC1 is electrically connected to the power supply component. The second conductor of the second polyvinyl chloride covered wire PVC2 is electrically connected to the power supply component.

When the first conductor of the first polyvinyl chloride covered wire PVC1 receives a first voltage that is a positive voltage from the power supply component and the second conductor of the second polyvinyl chloride covered wire PVC2 receives a second voltage that is a negative voltage from the power supply component, the light-emitting components LED1, LED3 to LED21 that are arranged along the odd columns can synchronously emit lights having a same color or different colors.

Alternatively, when the first conductor of the first polyvinyl chloride covered wire PVC1 receives a first voltage that is a negative voltage from the power supply component and the second conductor of the second polyvinyl chloride covered wire PVC2 receives a second voltage that is a positive voltage from the power supply component, the light-emitting components LED2, LED4 to LED20 that are arranged along the even columns can synchronously emit lights having a same color or different colors.

Figure 9:
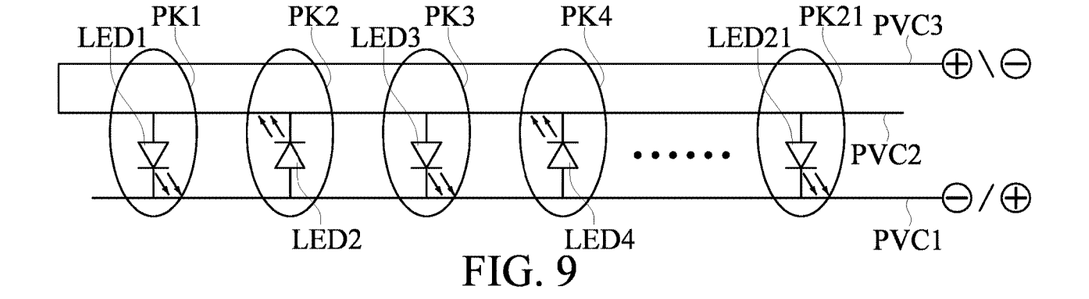
FIG. 9 is a circuit layout diagram of three polyvinyl chloride covered wires and light-emitting components of a light string according to an embodiment of the present disclosure.

Reference is made to FIG. 9. As shown in FIG. 9, the light string includes the first polyvinyl chloride covered wire PVC1, the second polyvinyl chloride covered wire PVC2, the third polyvinyl chloride covered wire PVC3, and the light-emitting components LED1 to LED21.

The second polyvinyl chloride covered wire PVC2 is electrically connected to the power supply component through the third conductor of the third polyvinyl chloride covered wire PVC3. The first polyvinyl chloride covered wire PVC1 is electrically connected to the power supply component.

When the first polyvinyl chloride covered wire PVC1 receives a first voltage that is a positive voltage from the power supply component through the third conductor of the third polyvinyl chloride covered wire PVC3, and the second polyvinyl chloride covered wire PVC2 receives a second voltage that is a negative voltage, the light-emitting components LED2, LED4 to LED20 that are arranged along the even columns can synchronously emit lights having a same color or different colors.

Alternatively, when the first polyvinyl chloride covered wire PVC1 receives a first voltage that is a negative voltage from the power supply component through the third polyvinyl chloride covered wire PVC3 and the second polyvinyl chloride covered wire PVC2 receives a second voltage that is a positive voltage from the power supply component, the light-emitting components LED1, LED3 to LED21 that are arranged along the odd columns can synchronously emit lights having a same color or different colors.

Figure 10:
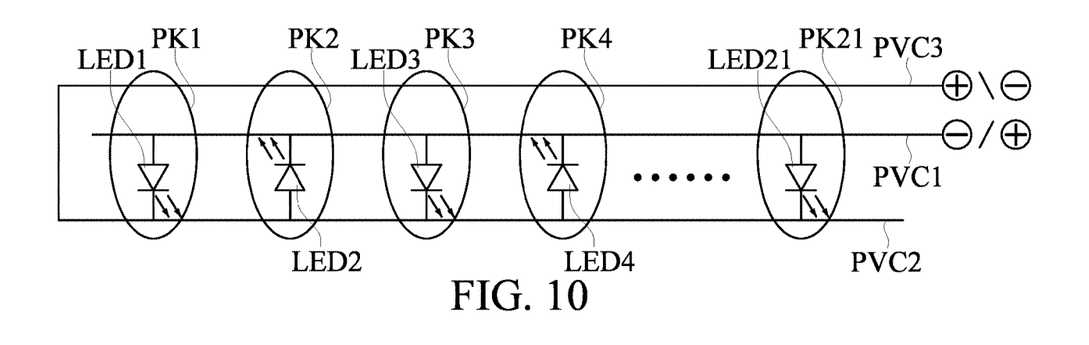
FIG. 10 is a circuit layout diagram of three polyvinyl chloride covered wires and light-emitting components of a light string according to an embodiment of the present disclosure.

Reference is made to FIG. 10. As shown in FIG. 10, the light string includes the first polyvinyl chloride covered wire PVC1, the second polyvinyl chloride covered wire PVC2, the third polyvinyl chloride covered wire PVC3, and the light-emitting components LED1 to LED21.

For example, each of the light-emitting components LED1 to LED21 may be a light-emitting diode and have a single chip.

The first polyvinyl chloride covered wire PVC1 is electrically connected to the first terminals that are positive electrodes of the light-emitting components LED1, LED3 to LED21 that are arranged along odd columns. The second polyvinyl chloride covered wire PVC2 is electrically connected to the second terminals that are negative electrodes of the light-emitting components LED1, LED3 to LED21 that are arranged along the odd columns.

The first polyvinyl chloride covered wire PVC1 is electrically connected to the first terminals that are negative electrodes of the light-emitting components LED2, LED4 to LED 20 that are arranged along even columns. The second polyvinyl chloride covered wire PVC2 is electrically connected to the second terminals that are positive electrodes of the other light-emitting components LED2, LED4 to LED 20 that are arranged along the even columns.

The first polyvinyl chloride covered wire PVC1 is electrically connected to the power supply component. The second polyvinyl chloride covered wire PVC2 is electrically connected to the power supply component through the third conductor of the third polyvinyl chloride covered wire PVC3.

When the first polyvinyl chloride covered wire PVC1 receives a first voltage that is a positive voltage from the power supply component and the second polyvinyl chloride covered wire PVC2 receives a second voltage that is a negative voltage through the third polyvinyl chloride covered wire PVC3 from the power supply component, the light-emitting components LED1, LED3 to LED21 that are arranged along the odd columns can synchronously emit lights having a same color or different colors.

Alternatively, when the first polyvinyl chloride covered wire PVC1 receives a first voltage that is a negative voltage from the power supply component and the second polyvinyl chloride covered wire PVC2 receives a second voltage that is a positive voltage through the third polyvinyl chloride covered wire PVC3 from the power supply component, the light-emitting components LED2, LED4 to LED 20 that are arranged along the even columns can synchronously emit lights having a same color or different colors.

Figure 11:
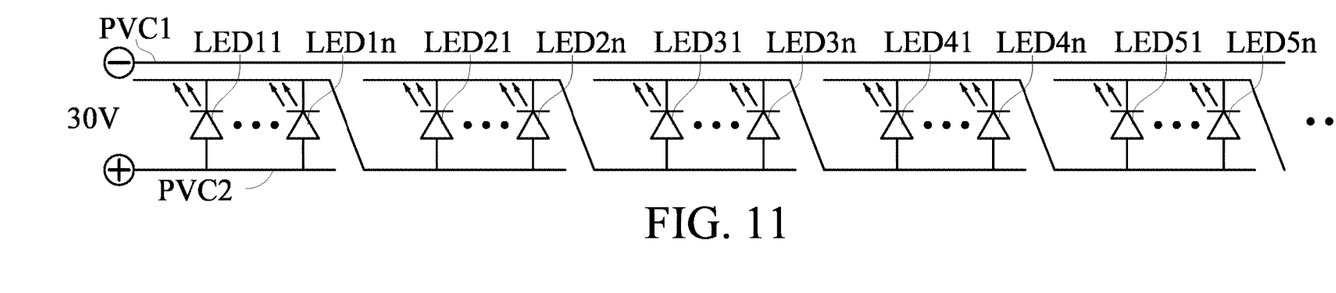
FIG. 11 is a circuit diagram of a single loop circuit formed by two polyvinyl chloride covered wires and light-emitting components each having a single chip in a light string according to an embodiment of the present disclosure.

Reference is made to FIG. 11. As shown in FIG. 11, the light string includes the first polyvinyl chloride covered wire PVC1, the second polyvinyl chloride covered wire PVC2 and light-emitting components LED11 to LED In to LEDm1 to LEDmn that may be light-emitting diodes, wherein m and n are integer values. For example, each of the light-emitting components LED11 to LED1$n$, LED21 to LEDm1 to LEDmn may be a light-emitting diode and have a single chip.

First terminals that are negative electrodes of the light-emitting components to LEDm1 to LEDmn are electrically connected to the first polyvinyl chloride covered wire PVC1. The first polyvinyl chloride covered wire PVC1 is connected to the power supply component.

Second terminals that are positive electrodes of the light-emitting components LED11 to LED In to LEDm1 to LEDmn are electrically connected to the second polyvinyl chloride covered wire PVC2. The second polyvinyl chloride covered wire PVC2 is connected to the power supply component.

When the power supply component supplies power such as 30 volts, the first polyvinyl chloride covered wire PVC1 receives a first voltage that is a negative voltage from the power supply component and the second polyvinyl chloride covered wire PVC2 receives a second voltage that is a positive voltage from the power supply component, and the light-emitting components LED11 to LED1$n$ to LEDm1 to LEDmn can synchronously emit lights having a same color or different colors.

Figure 12:
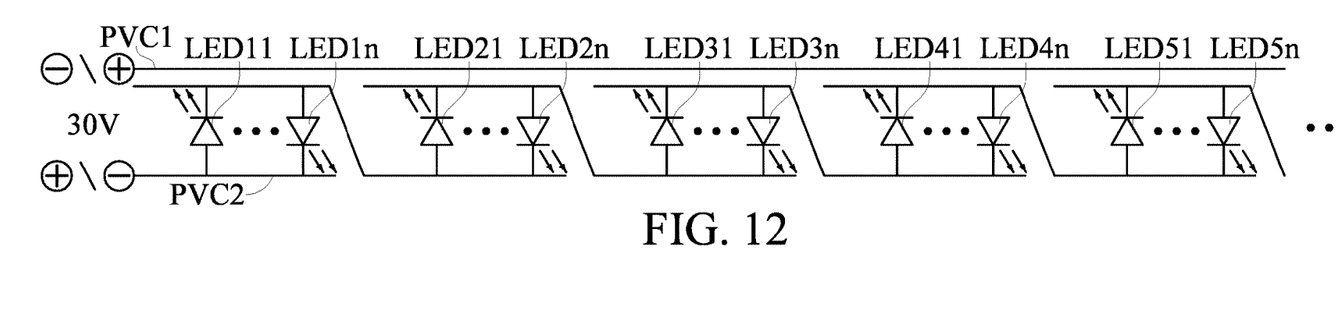
FIG. 12 is a circuit diagram of a double loop circuit formed by two polyvinyl chloride covered wires and light-emitting components each having a single chip in a light string according to an embodiment of the present disclosure.

Reference is made to FIG. 12. As shown in FIG. 12, the light string includes the first polyvinyl chloride covered wire PVC1 and the second polyvinyl chloride covered wire PVC2, and the light-emitting components LED11 to LED1$n$ to LEDm1 to LEDmn.

The first polyvinyl chloride covered wire PVC1 is electrically connected to the first terminals that are positive electrodes of the light-emitting components arranged along even columns in each of the lighting groups such as the light-emitting components LED1$n$, LED3$n$, LED4$n$ and LED5$n$. The second polyvinyl chloride covered wire PVC2 is electrically connected to the second terminals that are negative electrodes of the light-emitting components arranged along the even columns in each of the lighting groups.

The first polyvinyl chloride covered wire PVC1 is electrically connected to the first terminals that are negative electrodes of the light-emitting components arranged along odd columns in each of the lighting groups such as the light-emitting components LED11, LED21, LED31, LED41, LED51.

The second polyvinyl chloride covered wire PVC2 is electrically connected to the second terminals that are positive electrodes of the other light-emitting components arranged along the odd columns in each of the lighting groups. The first polyvinyl chloride covered wire PVC1 and the second polyvinyl chloride covered wire PVC2 are electrically connected to the power supply component.

When the power supply component supplies power such as 30 volts, the first polyvinyl chloride covered wire PVC1 receives a first voltage that is a positive voltage from the power supply component and the second polyvinyl chloride covered wire PVC2 receives a second voltage that is a negative voltage from the power supply component, and the light-emitting components arranged along the even columns in each of the lighting groups can synchronously emit lights having a same color or different colors.

Alternatively, when the power supply component supplies power such as 30 volts, the first polyvinyl chloride covered wire PVC1 receives a first voltage that is a negative voltage from the power supply component and the second polyvinyl chloride covered wire PVC2 receives a second voltage that is a positive voltage from the power supply component, and the light-emitting components arranged along the odd columns in each of the lighting groups can synchronously emit lights having a same color or different colors.

Figure 13:
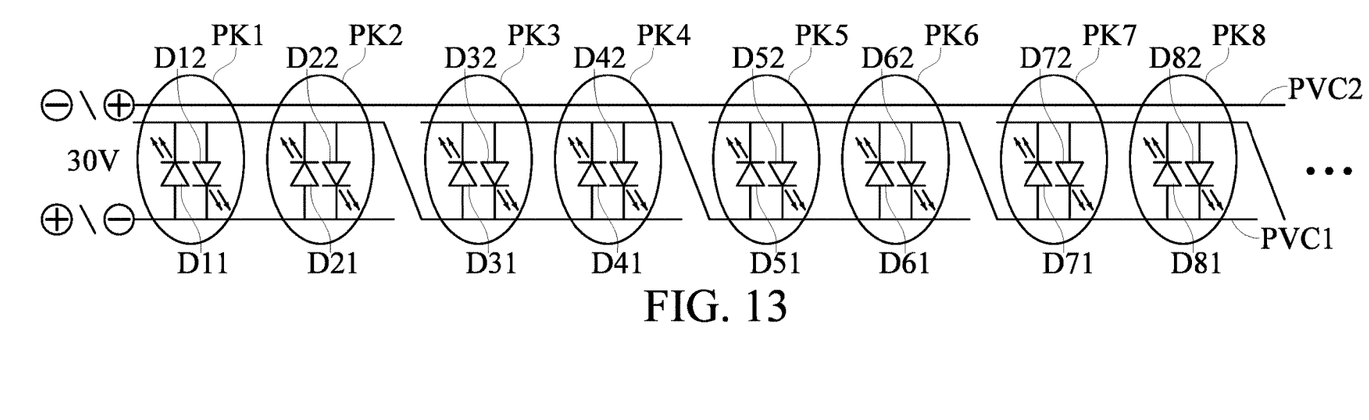
FIG. 13 is a circuit layout diagram of two polyvinyl chloride covered wires and light-emitting components each having double chips in a light string according to an embodiment of the present disclosure.

Reference is made to FIG. 13. The light string includes the first polyvinyl chloride covered wire PVC1 and the second polyvinyl chloride covered wire PVC2, and a plurality of light-emitting components.

Each of the light-emitting components may have multiple chips such as double chips D11 to Dm1 and D12 to Dm2, wherein m is an integer value. For example, as shown in FIG. 13, a first one of the light-emitting components includes double chips D11 and D12, a second one of the light-emitting components includes double chips D21 and D22, a third one of the light-emitting components includes double chips D31 and D32, a fourth one of the light-emitting components includes double chips D41 and D42, a fifth one of the light-emitting components includes double chips D51 and D52, a sixth one of the light-emitting components includes double chips D61 and D62, a seventh one of the light-emitting components includes double chips D71 and D72, an eighth one of the light-emitting components includes double chips D81 and D82, and so on.

One of the double chips of the light-emitting components, such as the chips D11, D21, D31, D41, D51, D61, D71, D81 and so on, emits a light having a first color. Another of the double chips of the light-emitting components, such the chips D12, D22, D32, D42, D52, D62, D72, D82 and so on, emits light having a second color that is different from the first color.

The first conductor of the first polyvinyl chloride covered wire PVC1 is electrically connected to the first terminals that are positive electrodes of the one chip of each of the emitting components such as the chips D11 to Dm1. The second conductor of the second polyvinyl chloride covered wire PVC2 is electrically connected to the second terminals that are negative electrodes of the one chip of each of the emitting components such as the chips D11 to Dm1.

The first conductor of the first polyvinyl chloride covered wire PVC1 is electrically connected to the first terminals that are negative electrodes of the another chip of each of the emitting components such as the chips D12 to Dm2 The second conductor of the second polyvinyl chloride covered wire PVC2 is electrically connected to the second terminals that are positive electrodes of the another chip of each of the emitting components such as the chips D12 to Dm2.

The second conductor of the second polyvinyl chloride covered wire PVC2 is electrically connected to the power supply component.

When the first polyvinyl chloride covered wire PVC1 receives a first voltage that is a positive voltage from the power supply component and the second polyvinyl chloride covered wire PVC2 receives a second voltage that is a negative voltage from the power supply component, the another chip of each of the emitting components such as the chips D11 to Dm1 can emit the light having the first color.

Alternatively, when the first polyvinyl chloride covered wire PVC1 receives a first voltage that is a negative voltage from the power supply component and the second polyvinyl chloride covered wire PVC2 receives a second voltage that is a positive voltage from the power supply component, the another chip of each of the emitting components such as the chips D12 to Dm2 can emit the light having the second color.

Reference is made to FIGS. 14 to 17. The first conductor of the first polyvinyl chloride covered wire PVC1 is electrically connected to a first terminal of each of the chips of the light-emitting components such as the chips D11 and D12. The second conductor of the second polyvinyl chloride covered wire PVC2 is electrically connected to a second terminal of each of the chips of the light-emitting components such as the chips D11 and D12.

Figure 14:
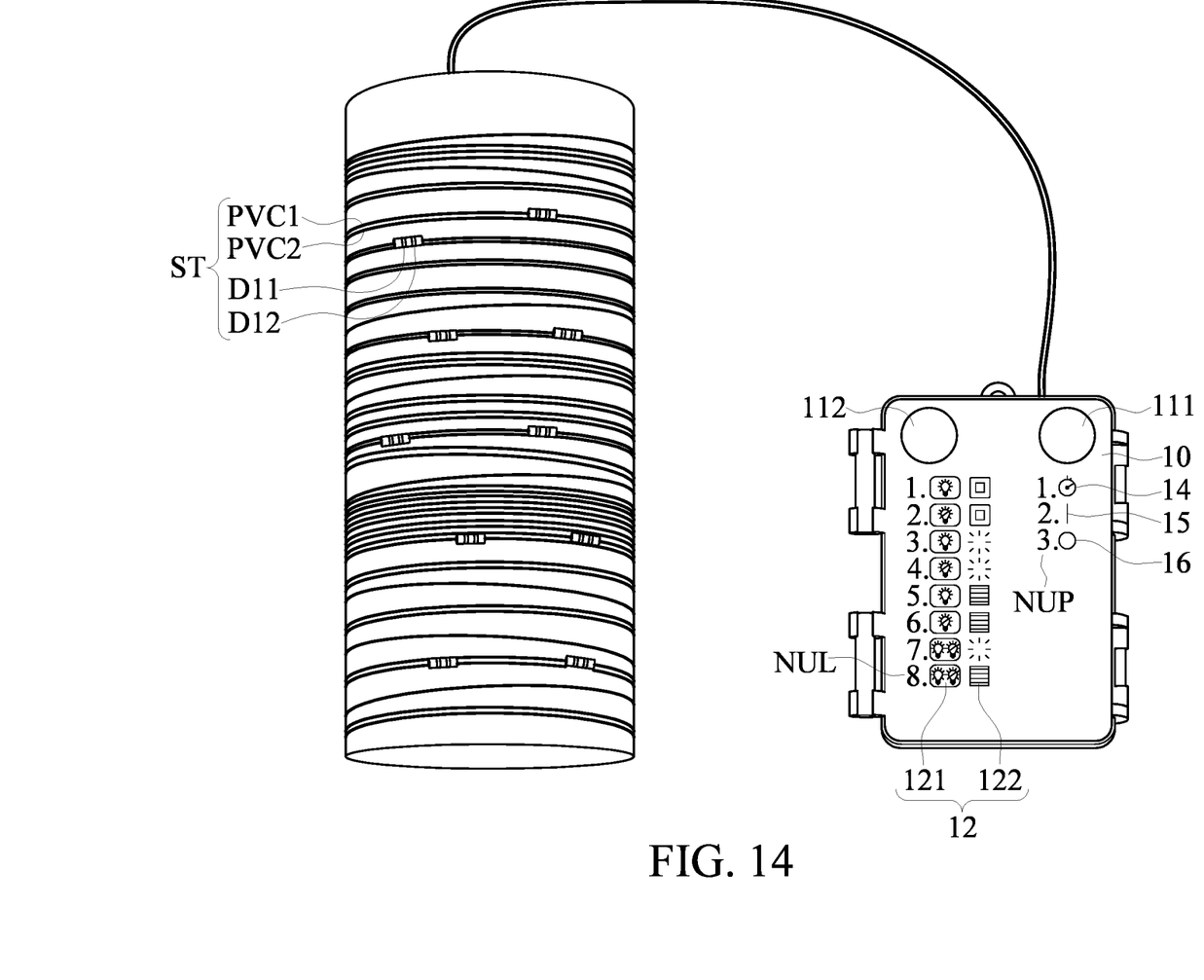
FIG. 14 is a front view of a control box and a light string according to an embodiment of the present disclosure.
Figure 17:
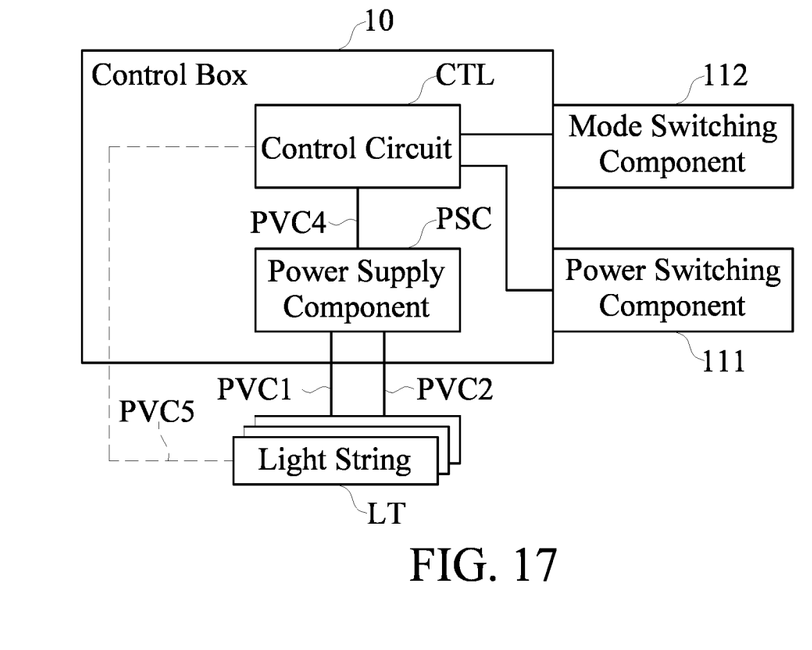
FIG. 17 is a functional block diagram of a light string according to the embodiment of the present disclosure.

A first terminal and a second terminal of each of the light-emitting components of a light strip ST are electrically connected to the power supply component PSC respectively through the first polyvinyl chloride covered wire PVC1 and the second polyvinyl chloride covered wire PVC2. The power supply component PSC is electrically connected to the control circuit CTL through a fourth polyvinyl chloride covered wire PVC4. The first polyvinyl chloride covered wire PVC1 or the second polyvinyl chloride covered wire PVC2 is electrically connected to a power supply component PSC through a third polyvinyl chloride covered wire. A control circuit CTL is connected to the light-emitting components through a fifth polyvinyl chloride covered wire PVC5.

Figure 15:
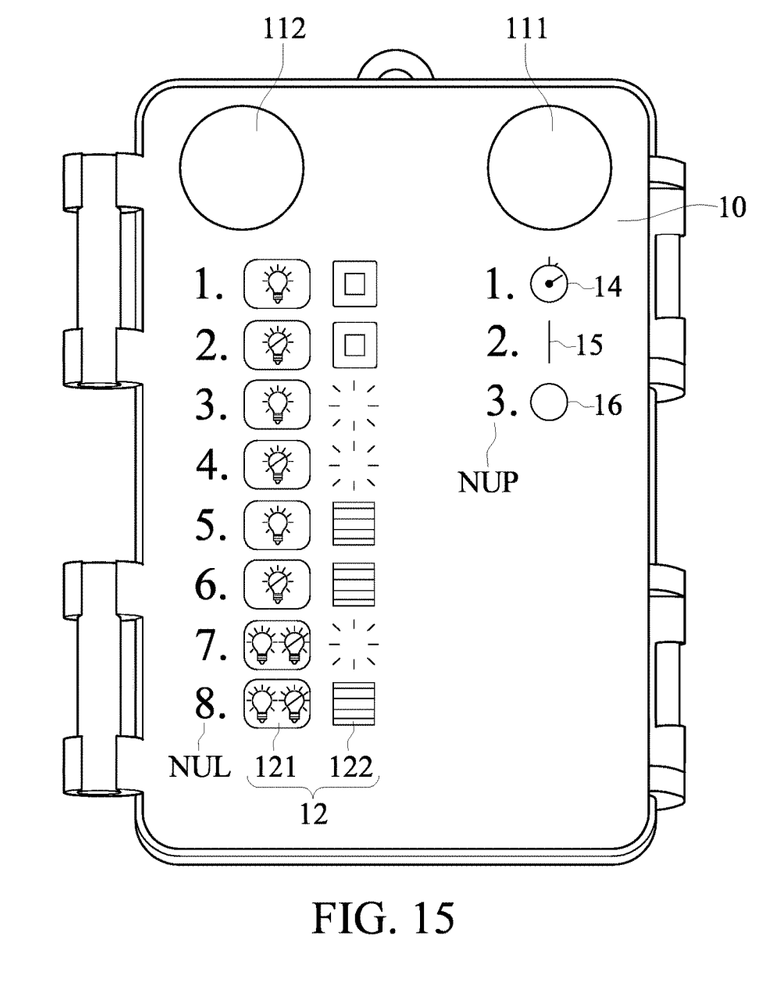
FIG. 15 is a front view of the control box according to the embodiment of the present disclosure.

A plurality of sequence numbers includes a first sequence number group NUP and a second sequence number group NUL. A turning-on timing pattern 14, a cancelling timing pattern 15 and a turning-off timing pattern 16 respectively correspond to the plurality of sequence numbers of the first sequence number group NUP. The first sequence number group NUP represents the number of times that the switch button 111 needs to be triggered. A plurality of lighting patterns 12 includes a first lighting pattern group 121 and a second lighting pattern group 122, which respectively correspond to the plurality of sequence numbers of the second sequence number group NUL and respectively represent a plurality of lighting modes.

Figure 16:
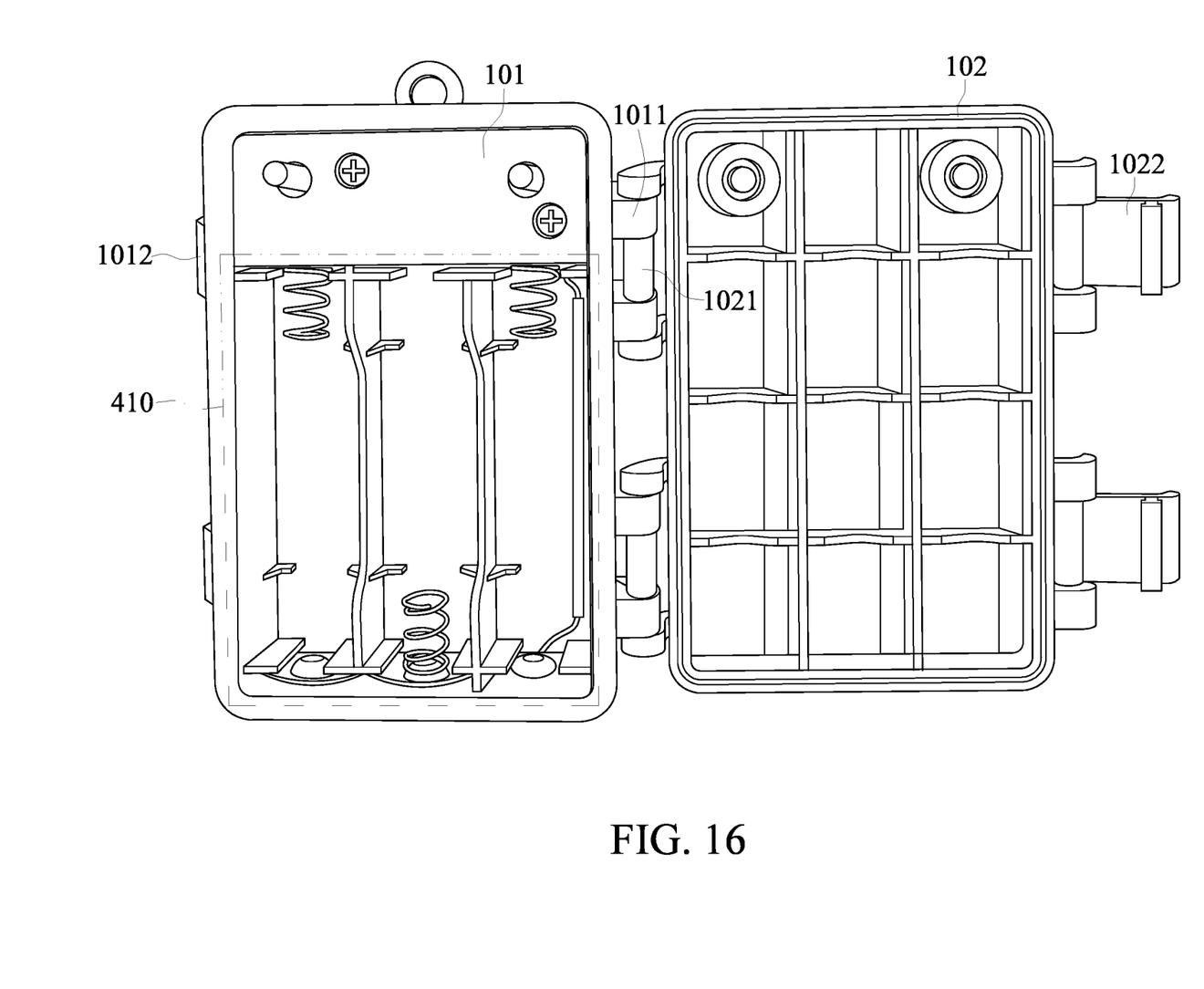
FIG. 16 is a schematic view of an internal structure of the control box according to the embodiment of the present disclosure.

A plurality of power supply components such as batteries or a transformer may be accommodated in a power source accommodation space 410 of a box body 101 of a control box 10.

The plurality of lighting modes includes a steady white light mode, a steady multicolor light mode, a flashing white light mode, a flashing multicolor light mode, a fading white light mode, a fading multicolor light mode, a flash white-multicolor light alternating mode, a fading white-multicolor light alternating mode. The light string emits a steady white light in the steady white light mode. The light string emits a steady multicolor light in the steady multicolor light mode. The light string emits a flashing white light in the flashing white light mode. The light string emits a flashing multicolor light in the flashing multicolor light mode. The light string initially emits a white light having an initial white brightness, which gradually decreases to a gray value as time progresses and then changes back to the initial white brightness, in the fading white light mode. The light string initially emits a multicolor light having an initial multicolor brightness, which gradually decreases to a gray value as time progresses and then changes back to the initial multicolor brightness, in the fading multicolor light mode. The light string alternatingly emits a white light and a multicolor light in the flash white-multicolor light alternating mode. The light string emits a light, which initially has a first gray value, then gradually changes to a preset white light brightness, then gradually changes to a second gray value, and then gradually changes to a preset multicolor light brightness, in the fading white-multicolor light alternating mode.

What is claimed is:

1. A light string, comprising:
a plurality of light-emitting components configured to emit light having a same color or different colors;
a first polyvinyl chloride covered wire having a first conductor and a first insulator, wherein one part of the first conductor is covered by the first insulator and other parts of the first conductor are exposed, the first conductor is electrically connected to a first terminal of each of the light-emitting components and a first power terminal of a power supply component, and the first conductor of the first polyvinyl chloride covered wire receives a first voltage supplied by the first power terminal of the power supply component; and
a second polyvinyl chloride covered wire having a second conductor and a second insulator, wherein one part of the second conductor is covered by the second insulator and other parts of the second conductor are exposed, the second conductor is electrically connected to a second terminal of each of the light-emitting components and a second power terminal of the power supply component, and the second conductor of the second polyvinyl chloride covered wire receives a second voltage from the second power terminal of the power supply component;
wherein the plurality of lighting modes includes a steady white light mode, a steady multicolor light mode, a flashing white light mode, a flashing multicolor light mode, a fading white light mode, a fading multicolor light mode, a flash white-multicolor light alternating mode, and a fading white-multicolor light alternating mode;
wherein the light string emits a steady white light in the steady white light mode;
wherein the light string emits a steady multicolor light in the steady multicolor light mode;
wherein the light string emits a flashing white light in the flashing white light mode;
wherein the light string emits a flashing multicolor light in the flashing multicolor light mode;
wherein the light string initially emits a white light having an initial white brightness, which gradually decreases to a gray value as time progresses and then changes back to the initial white brightness, in the fading white light mode;
wherein the light string initially emits a multicolor light having an initial multicolor brightness, which gradually decreases to a gray value as time progresses and then changes back to the initial multicolor brightness, in the fading multicolor light mode;
wherein the light string alternatingly emits a white light and a multicolor light in the flash white-multicolor light alternating mode;
wherein the light string emits a light, which initially has a first gray value, then gradually changes to a preset white light brightness, then gradually changes to a second gray value, and then gradually changes to a preset multicolor light brightness, in the fading white-multicolor light alternating mode.

2. The light string according to claim 1, wherein each of the light-emitting components is placed on the first polyvinyl chloride covered wire and the second polyvinyl chloride covered wire.

3. The light string according to claim 1, wherein each of the light-emitting components is placed between the first polyvinyl chloride covered wire and the second polyvinyl chloride covered wire.

4. The light string according to claim 1, wherein the first terminal of each of the plurality of light-emitting components is a positive electrode and receives the first voltage that is a positive voltage, and the second terminal of each of the plurality of light-emitting components is a negative electrode and receives the second voltage that is a negative voltage.

5. The light string according to claim 1, wherein the first terminal of each of the plurality of light-emitting components is a negative electrode and receives the first voltage that is a negative voltage, and the second terminal of each of the plurality of light-emitting components is a positive electrode and receives the second voltage that is a positive voltage.

6. The light string according to claim 1, wherein the first terminal of each of the plurality of light-emitting components arranged along odd columns is a positive electrode, and the second terminal of each of the plurality of light-emitting components arranged along the odd columns is a negative electrode, and the first terminal of each of the plurality of light-emitting components arranged along even columns is a negative electrode, and the second terminal of each of the plurality of light-emitting components arranged along the even columns is a positive electrode.

7. The light string according to claim 1, wherein the first terminal of each of the plurality of light-emitting components arranged along odd columns is a negative electrode, and the second terminal of each of the plurality of light-emitting components arranged along the odd columns is a positive electrode, and the first terminal of each of the plurality of light-emitting components arranged along even columns is a positive electrode, and the second terminal of each of the plurality of light-emitting components arranged along the even columns is a negative electrode.

8. The light string according to claim 1, further comprising:
a third polyvinyl chloride covered wire having a third conductor and a third insulator, wherein one part of the third conductor is covered by the third insulator and other parts of the third conductor are exposed;
wherein the third conductor of the third polyvinyl chloride covered wire is electrically connected to the first conductor of the first polyvinyl chloride covered wire and the first power terminal of the power supply component, and the first conductor of the first polyvinyl chloride covered wire receives the first voltage through the third conductor of the third polyvinyl chloride covered wire from the power supply component.

9. The light string according to claim 8, wherein the first voltage is a positive voltage and the second voltage is a negative voltage, or the first voltage is a negative voltage and the second voltage is a positive voltage.

10. The light string according to claim 1, further comprising:
a third polyvinyl chloride covered wire having a third conductor and a third insulator, wherein one part of the third conductor is covered by the third insulator and other parts of the third conductor are exposed;
wherein the third conductor of the third polyvinyl chloride covered wire is electrically connected to the second conductor of the second polyvinyl chloride covered wire and the second power terminal of the power supply component, and the second conductor receives the second voltage through the third conductor of the third polyvinyl chloride covered wire from the power supply component.

11. The light string according to claim 10, wherein the first voltage is a positive voltage and the second voltage is a negative voltage, or the first voltage is a negative voltage and the second voltage is a positive voltage.

12. The light string according to claim 1, wherein each of the light-emitting components includes one or more light-emitting chips.

13. The light string according to claim 1, wherein the power supply component is electrically connected to a control circuit and controlled by the control circuit.

14. The light string according to claim 13, wherein the control circuit and the power supply component are accommodated in a control box, and a power switching component is disposed on the control box;

wherein, when the power switching component receives a turning-on trigger, the control circuit controls the power supply component to supply power to the light-emitting components according to the turning-on trigger;

wherein, when the power switching component receives a turning-off trigger, the control circuit controls the power supply component to stop supplying the power to the light-emitting components according to the turning-off trigger.

15. The light string according to claim 14, wherein the light-emitting components are electrically connected to the control circuit, and a mode switching component is disposed on the control box;

wherein, when the mode switching component receives one or more lighting triggers, the control circuit controls the light-emitting components according to the number of the lighting triggers.

16. The light string according to claim 15, wherein the mode switching component and the power switching component are combined into a single component or disposed separately from each other.

17. The light string according to claim 15, wherein a plurality of lighting patterns and a plurality of sequence numbers are marked on the control box, the plurality of lighting patterns respectively represent a plurality of lighting modes and respectively correspond to the sequence numbers, and each of the sequence numbers represents the number of times that the mode switching component needs to be triggered.

18. The light string according to claim 1, wherein the power supply component includes a battery or a transformer.

* * * * *